United States Patent [19]

Sussich et al.

[11] Patent Number: 5,089,132
[45] Date of Patent: Feb. 18, 1992

[54] FILTER ASSEMBLY

[75] Inventors: Marino R. Sussich, North Altona; Paul Sussich, Werribee, both of Australia

[73] Assignee: Kagisho Pty. Ltd., Australia

[21] Appl. No.: 410,601

[22] Filed: Sep. 21, 1989

[30] Foreign Application Priority Data

Apr. 20, 1989 [AU] Australia ............... PJ3788

[51] Int. Cl.$^5$ ............................................. B01D 21/28
[52] U.S. Cl. ..................................... 210/298; 210/305
[58] Field of Search ............... 210/297, 298, 299, 305, 210/306, 310, 316, 319, 320, 384, 385, 521, 523

[56] References Cited

U.S. PATENT DOCUMENTS

| 1,035,653 | 8/1912 | Stubbe | 210/306 |
| 1,723,374 | 8/1929 | Roehr | 210/305 |
| 4,371,437 | 2/1983 | Iwasaki et al. | 210/521 |

FOREIGN PATENT DOCUMENTS 1421890  9/1988  U.S.S.R. ........................... 210/384

Primary Examiner—Robert A. Dawson
Assistant Examiner—Matthew O. Savage
Attorney, Agent, or Firm—Merchant, Gould, Smith, Edell, Welter & Schmidt

[57] ABSTRACT

A filter assembly for filtering contaminants from liquid. A housing has a filtering chamber and an inlet port and an outlet port communicating with the chamber for flow of liquid therethrough. Filter media is located in the filtering chamber for filtering contaminants from liquid flowing through the chamber. A sump region is provided in the filtering chamber for collection of contaminants from the liquid, and a separator member is located in the filtering chamber and substantially separating the filter media and sump region. The separator member provides for communication of the contaminants into the sump region but tends to trap contaminants from the liquid received in the sump region.

2 Claims, 2 Drawing Sheets

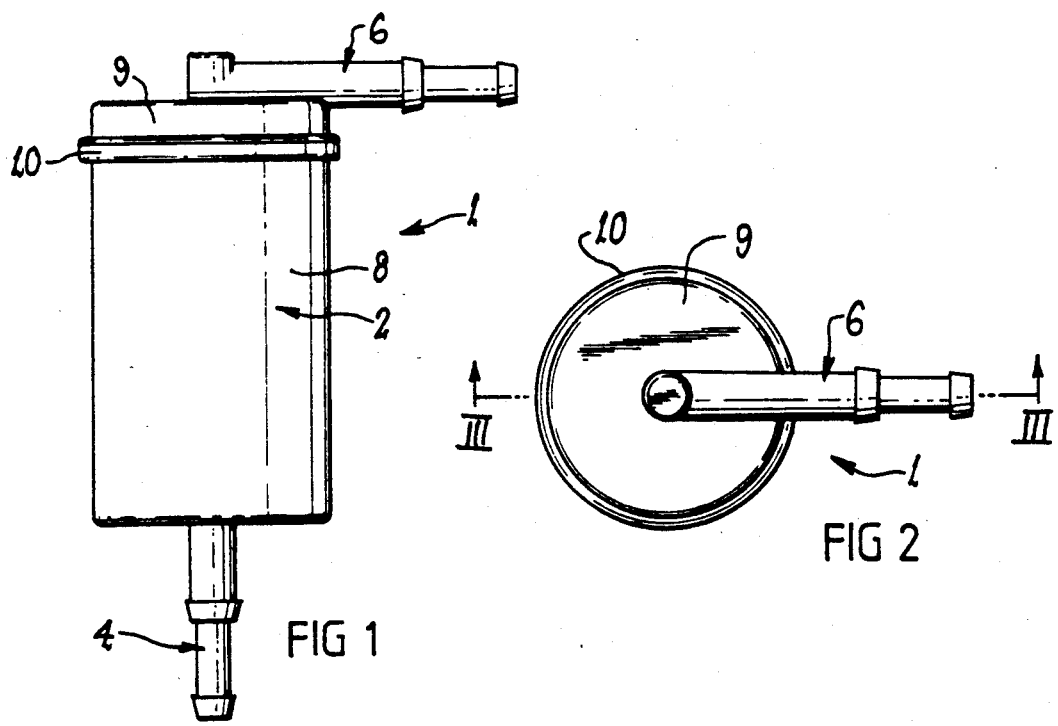
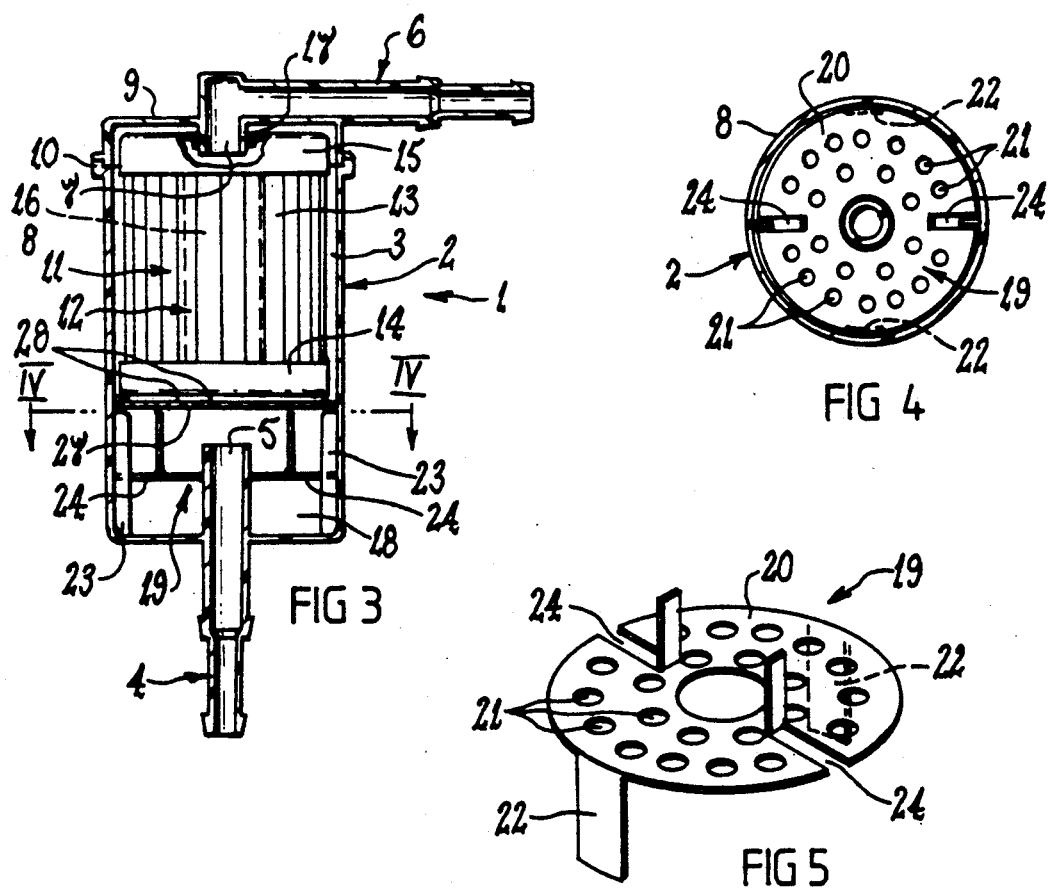

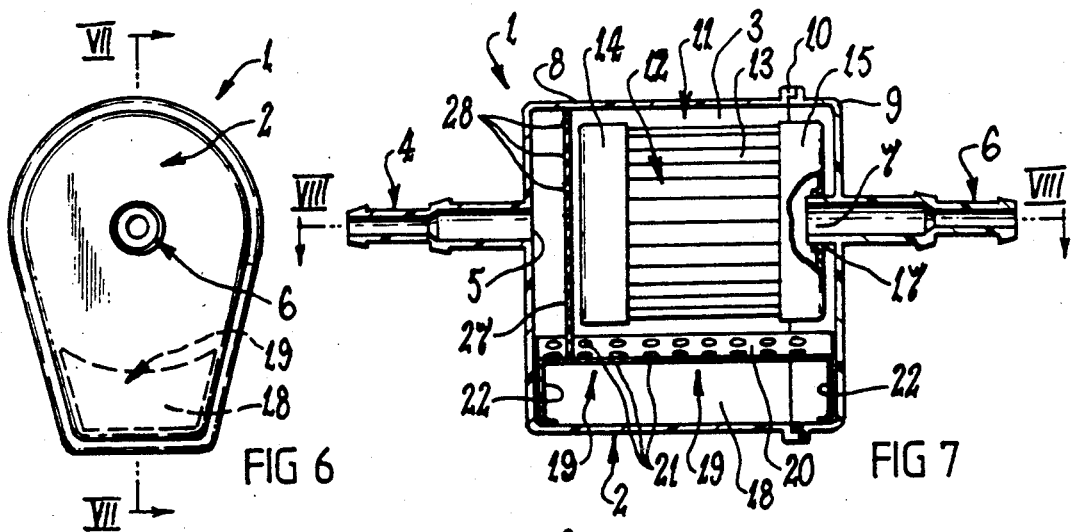
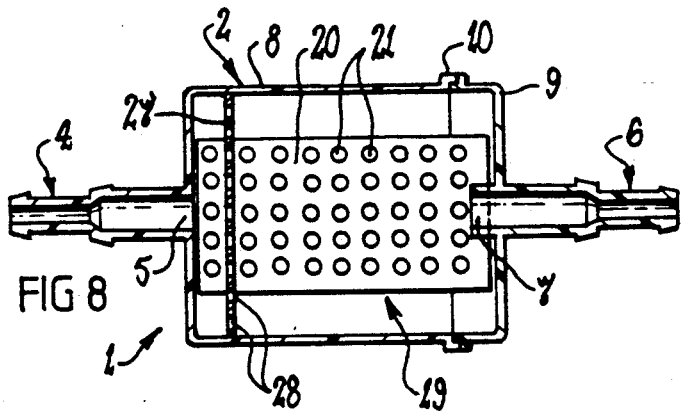
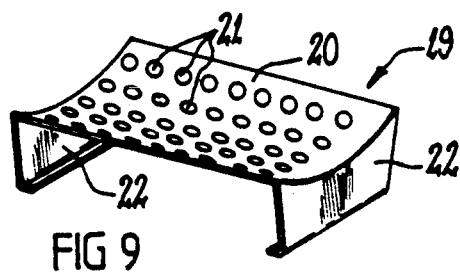
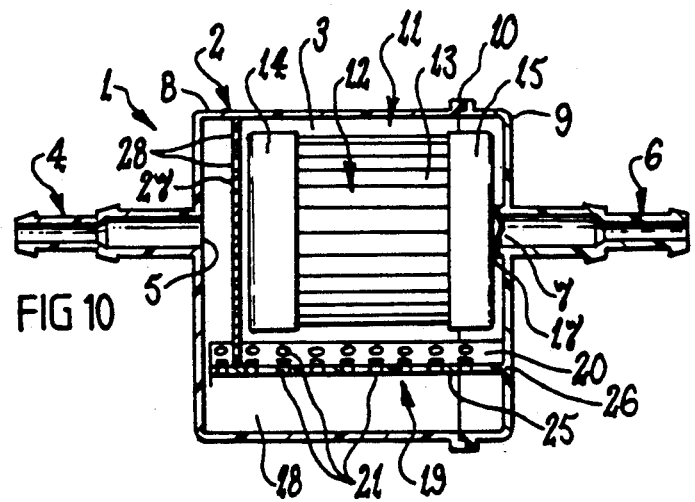

FILTER ASSEMBLY

This invention relates generally to filtration of contaminants from liquids, and more particularly to a filter assembly for filtering contaminants from liquid fuels. The filter assembly is applicable for filtering petroleum and other hydrocarbon based fuels used to power internal combustion engines, such as vehicle engines, and it will be convenient to hereinafter describe the invention in relation to that exemplary application. It is to be appreciated, however, that the invention is not limited to that application.

It is common practice to install a fuel filter assembly in a fuel line of petrol and diesel powered internal combustion engines. The function of the assembly is to remove particulate contiminants, such as dirt, from the fuel before the fuel is delivered to the combustion chambers of the engine. If such contaminants are allowed to enter the combustion chambers then engine damage may be caused.

Filter assemblies which are currently used suffer the disadvantage that when the fuel contains more contaminants than can be trapped by the assembly, that assembly becomes clogged and no longer functions effectively. This can cause particulate contaminants to pass to the engine causing damage. Further, filter assemblies currently used are generally ineffective in removing liquid contaminants, such as water, from the fuel.

It is an object of the present invention to provide an improved filter assembly which overcomes, or at least alleviates, the problems of known filter assemblies.

With that object in mind, the present invention provides a filter assembly for filtering contaminants from liquid, including: a housing providing a filtering chamber and having an inlet port and an outlet port communicating with the chamber for flow of liquid therethrough; filter media in the filtering chamber for filtering contaminants from liquid flowing through the chamber; a sump region in the filtering chamber for collection of contaminants from the liquid; and, a separator member located in the filtering chamber and substantially separating the filter media and sump region, the separator member providing for communication of the contaminants into the sump region and tending to trap the contaminants from the liquid received in the sump region.

Preferably, the separator member moves relative to the housing during use of the filter assembly. This movement facilitate separation of the contaminants from the liquid and their collection in the sump region. The separator member is preferably retained in the filtering chamber for vibratory movement caused by housing movement during use of the filter assembly.

In one arrangement, the separator member is preferably connected to the housing for its location within the filtering chamber. However, that connection permits the separator member to move during use of the filter assembly. In another arrangement the separator member is preferably loosely nested in the filtering chamber, and particularly in the sump region thereof.

Preferably, the separator member includes a separator plate. That plate preferably extends across the filtering chamber between the filter media and sump region. The plate may extend entirely across that chamber.

In one embodiment the separator plate has an edge region pivotably connected to the housing for location of the plate within the filtering chamber. In an alternative arrangement, the separator member has a plurality of legs extending from the separator plate and on which the separator member stands in the filtering chamber.

Preferably, the separator member has an array of openings therethrough providing communication for the contaminants into the sump region.

The filter assembly may further include a baffle member located in the filtering chamber between the inlet port and the filter media. In this way liquid flowing into the filtering chamber impinges upon the baffle member causing at least some contaminants entrained in the liquid to deflect toward the sump region for collection therein. That baffle member may be fixed above the sump region and may extend across the filtering chamber generally perpendicular to a longitudinal axis of the inlet port. The baffle member may have an array of openings therethrough providing liquid communication between the inlet port and filter media.

The following description refers to preferred embodiments of the filter assembly of the present invention. To facilitate an understanding of the invention, reference is made in the description to the accompanying drawings where the assembly is illustrated in those preferred embodiments. It is to be understood that the assembly is not limited to the embodiments as hereinafter described and as illustrated in the drawings.

In the drawings, where like components are identified by the same numerals:

FIG. 1 is a side view of a filter assembly according to one preferred embodiment of the present invention;

FIG. 2 is top plan view of the filter assembly of FIG. 1;

FIG. 3 is a sectional side view through section III—III of FIG. 1;

FIG. 4 is a sectional plan view through section IV—IV of FIG. 3;

FIG. 5 is a perspective view of the separator member of the filter assembly of FIG. 1;

FIG. 6 is an end view of a filter assembly according to another preferred embodiment of the present invention;

FIG. 7 is a sectional side view through section VII—VII of FIG. 6;

FIG. 8 is a sectional plan view through section VIII—VIII of FIG. 7;

FIG. 9 is a perspective view of the separator member of the filter assembly of FIG. 6; and, FIG. 10 is a sectional side view of a filter assembly according to a further preferred embodiment of the present invention.

Referring to the drawings there is generally shown alternative embodiments of filter assembly 1. Assembly 1 has housing 2 defining filtering chamber 3. Housing 2 has an inlet tube 4 providing inlet port 5 communication with chamber 3, and also outlet tube 6 providing outlet port 7 communicating with chamber 3. As shown, inlet tube 4 and/or outlet tube 6 may project a short distance into chamber 3 so that inlet port 5 and/or outlet port 7 are located within chamber 3.

Tubes 4, 6 are constructed for connection to liquid flow lines (not shown) so that liquid in the flow lines can flow through port 5 into chamber 3 and therefrom through port 7.

Inlet and outlet ports 5, 7 are co-axial and located toward opposite ends of housing 2. As shown, filter assembly 1 of FIGS. 1 to 5 is intended for generally vertical, upward flow of liquid, whilst filter assemblies 1 of FIGS. 6 to 9, and FIG. 10 are intended for generally horizontal flow of liquid.

Housing 2 is of a generally enclosed cylindrical shape, although other shapes may be equally suitable. Housing 2 includes open ended body 8 and closure cap 9, which may be removable for access to filtering chamber 3, such as for maintenance. Cap 9 can be secured to body 8 through any suitable connection arrangement, such as by means of snap connection 10, or a screw thread connection (not shown).

Housing 2 is of a generally integral construction. To that end, inlet tube 4 can be molded or cast integral with body 8, whilst outlet tube 6 can be molded or cast integral with cap 9. It should be appreciated that, in particular, tubes 4, 6 may be otherwise connected to body 8 and cap 9.

Housing 2 may be constructed of any suitable materials. Selection of materials may depend on the liquid to be filtered. In these embodiments, housing 2 is composed at least in part of transparent or translucent material to allow at least partial visual inspection of filtering chamber 3. Conveniently, housing 2 is composed of plastics material.

Filter assembly 1 includes filter media 11 in chamber 3 for filtering contaminants from liquid flowing therethough. Filter media 11 is particularly constructed for removing solid Particulates from the liquid.

Filter media 11 is in the form of filter cartridge 12 in these embodiments. Cartridge 12 is mounted in chamber 3 and includes generally annular filter member 13 and end caps 14, 15. In these embodiments, filter member 13 is composed of filter sheet material corrugated or pleated into its annular configuration so as to define inner chamber 16. Filter member 13 may be of any other suitable construction and, by way of example, may be composed of foam material.

End caps 14, 15 may be interferingly fitted over filter member 13 to assist in retaining the filter sheet material in the corrugated or pleated configuration. The filter sheet material may be paper or cardboard based material.

End cap 14 is closed, whilst end cap 15 has aperture 17 therein into which outlet tube 6 projects for communication with inner chamber 16 of filter member 13. Filter member 13 is fixed in position in chamber 3 by connection of end cap 15 to outlet tube 6, although may be removable therefrom for cleaning and/or replacement. With this arrangement, liquid entering through inlet port 5 into chamber 3 can flow through filter member 13 into inner chamber 16 and then to outlet port 7. In flowing through filter member 13, contaminants entrained in the liquid are trapped by filter member 13 in a typical filtering action.

Included within filtering chamber 13 is sump region 18 into which contaminants in the liquid can be collected clear of filter member 13. Housing 2 is suitably shaped to accomodate sump region 18. To that end, sump region 18 may be located entirely in housing body 8 (as shown in the assembly assemblies of FIGS. 6 to 9 and FIG. 10).

Sump region 18 is generally located at the bottom of chamber 3, beneath filter media 11 and also below inlet port 5. Thus, contaminants entrained in liquid entering chamber 3 can move under influence of gravity toward sump region 18.

Assembly 1 also includes separator member 19 separating filter media 11 from sump region 18. Separator member 19 facilitates separation of contaminants from the liquid and also acts to trap or retain contaminants received in sump region 18.

Separator member 19 includes separator plate 20 extending across chamber 3, dividing filter media 11 from sump region 18. Plate 20 has an array of openings 21 therethrough for communication into sump region 18. In these embodiments, openings 21 are a regular grid array of circular holes between about 1 and 3 mm in diameter, although other opening arrays, shapes and sizes are envisaged, depending at least to some extent on the type of liquid and contaminants flowing through assembly 1. In an alternative embodiment (not shown) separator plate 20 may be composed of suitable graded mesh material.

Separator member 19 is located in chamber 3 for limited movement during use of assembly 1. That movement is continuous vibration and is caused by vibration of housing 2 during use of assembly 1. In the exemplary application of assembly 1, vibration will be the result of associated engine operation and/or engine movement. Vibration of separator member 19 will be in directions of a general plane of member 19 and/or laterally of that plane.

The vibratory movement of separator member 19, and particularly Plate 20, assists in separating contaminants from the liquid. In that regard, contaminants contacting plate 20 may be broken down by the vibratory effect. That is particularly so when the contaminants are conglomerates of particulate material. Moreover, the vibratory movement tends to cause any contaminants resting on plate 20 to gravitate toward and pass through openings 21. Once collected in sump region 18, the continuous movement of Plate 20 reduces the likelihood of contaminants re-aligning with openings 21 and passing back through them out of sump region 18. That vibratory movement also inhibits purging of sump region 18 of collected contaminants by flow of liquid around filter media 11. That is particularly so in view of the small size of openings 21 and the rapid continuous vibration of separator member 19, even though some liquid will flow through openings 21 into and out of sump region 18 on its way through filter assembly 1.

Trapping of contaminants in sump region 18 removes those contaminants from filter media 11. That in turn may preserve the filtering integrity of filter member 13, thereby prolonging the operational life of assembly 1. In particular, removal of contaminants from filter member 13 prevents those contaminants from clogging, damaging or otherwise inhibiting the filtering effect of member 13.

In the embodiments shown in FIGS. 1 to 5 and FIGS. 6 to 9, separator member 19 is shaped and sized so as to be loosely located in chamber 3. In this way, member 19 will tend to rattle during use of assembly 1 to cause the necessary vibratory movement.

In those assembly embodiments, separator member 19 includes a plurality of support legs 22 (such as two as shown) projecting from separator Plate 20. Plate 20 stands on support legs 22 which bear on housing 2 in order to correctly locate separator plate 20. In an alternative arrangement (not shown) the support legs may be provided by housing 2 so that plate 20 bears on them.

The location of member 19 is such that plate 20 will vibrate without rotating in its general plane. In the assembly embodiment of FIGS. 1 to 5 that is achieved by Providing housing 2 with location legs 23 which loosely engage in cut outs 24 in plate 20, whilst in the assembly embodiment of FIGS. 6 to 9 that is achieved by suitable shaping of plate 20. Where assembly 1 can be dismantled for cleaning or other maintenance, then separator member 19 is removable from housing 2.

It should be appreciated that separator member 19 may be otherwise located in chamber 3. By way of example, in one further assembly embodiment shown in FIG. 10, separator plate 20 has one edge region 25 hingedly connected through connection 26 to housing 2 so as to generally locate member 19 but permit vibratory movement thereof. Member 19 may include at least one support leg (not shown) extending from plate 20 remote from connection 26 in order to support plate 20.

Conveniently, separator member 19 is of a one-piece construction. Member 19 may be composed of any suitable material, such as plastics material or metal.

Assembly 1 may optionally include baffle member 27 in filtering chamber 3 to assist in removing contaminants from the liquid. Baffle member 27 is fixed between inlet port 5 and end cap 14 of filter cartridge 12, and extends at least substantially perpendicular to the flow of liquid entering through inlet port 5. In this way, liquid flowing into chamber 3 tends to impinge upon member 27. This can have an effect on some contaminants that they are immediately redirected downwardly toward sump region 18, rather than onto protected against contact from those contaminants, which may in turn prolong filter assembly life.

Baffle member 27 has an array of openings 28 for communication of liquid therethrough to filter media 11. Openings 28 may be of a similar configuration to openings 21.

In operation of filter assembly 1, liquid with entrained contaminants flows through inlet port 5 and initially impacts upon end cap 14 (and/or baffle member 27 if present). Thereafter, the liquid flows around and through filter cartridge 12 into inner chamber 16 before passing through outlet port 7. During passage of the liquid through chamber 3, entrained contaminants are progressively removed from the liquid by action of filter media 11, separator member 19 and baffle member 27. Many of the contaminants will collect in sump region 18, with the remaining contaminants collecting on filter member 13.

The filter assembly of the present invention has an extended effective or operational life when compared with prior similar assemblies.

Finally, it should be appreciated that various modifications and/or alterations may be made to the filter assembly without departing from the ambit of the present invention as defined in the claims appended hereto.

We claim:

1. A filter assembly for filtering contaminants from liquid, including:

a housing providing a filtering chamber and having an inlet port and an outlet port communicating with the chamber for flow of liquid therethrough;

filter media in the filtering chamber for filtering contaminants from liquid flowing through the filter media to the outlet port;

a sump region in the filtering chamber at the bottom thereof below the inlet port and toward which contaminants in the liquid entering through the inlet port tend to gravitate for collection; and a separator member located in the filtering chamber and substantially separating the filter media and sump region, the separator member comprising a separator plate extending across the filtering chamber between the filter media and sump region, the separator plate having an edge portion through which the separator plate is hingedly connected to the housing, the separator member being arranged within the filtering chamber so as to vibrate relative to the housing during use of the filter assembly, vibration facilitating separation of the contaminants form the liquid entering through the inlet port and collection of the contaminants in the sump region, the separator plate providing for communication of the contaminants into the sump region and tending to trap the contaminants received in the sump region.

2. A filter assembly for filtering contaminants from liquid, including:

a housing providing a filtering chamber and having an inlet port and an outlet port communicating with the chamber for flow of liquid therethrough;

filter media in the filtering chamber for filtering contaminants from liquid flowing through the filter media to the outlet port;

a sump region in the filtering chamber at the bottom thereof below the inlet port and toward which contaminants in the liquid entering through the inlet port tend to gravitate for collection; and, a separator member located in the filtering chamber and substantially separating the filter media and sump region, the separator member comprising a separator plate extending across the filtering chamber between the filter media and sump region and a plurality of legs extending from the separator plate and on which the separator member stands in the filtering chamber, the separator member being arranged within the filtering chamber so as to vibrate relative to the housing during use of the filter assembly, vibration facilitating separation of the contaminants form the liquid entering through the inlet port and collection of the contaminants int he sump region, the separator plate providing for communication of the contaminants into the sump region and tending to trap the contaminants received in the sump region.

* * * * *

UNITED STATES PATENT AND TRADEMARK OFFICE
CERTIFICATE OF CORRECTION

PATENT NO. : 5,089,132
DATED : February 18, 1992
INVENTOR(S) : Marino R. Sussich, et. al.

It is certified that error appears in the above-indentified patent and that said Letters Patent is hereby corrected as shown below:

Column 3, line 59, insert --(as shown in the assemblies of Figs. 1 to 5) or in body 8 and cop 9-- after "8".

Column 3, line 59, delete "assembly" after the word "the".

Column 5, line 27 insert --filter member 13. To this extnet, filter media 11 is -- after the word "onto".

Column 6, line 52, claim2 delete "int he" and insert --in the--.

Signed and Sealed this

Nineteenth Day of October, 1993

Attest:

BRUCE LEHMAN

Attesting Officer   Commissioner of Patents and Trademarks